United States Patent [19]

Paulin

[11] Patent Number: 5,091,196

[45] Date of Patent: Feb. 25, 1992

[54] FORCEMEAT HAVING IMPROVED PROPERTIES, METHOD FOR THE PRODUCTION THEREOF AND HEAT SENSITIVE ENZYME CONTAINING MATERIAL FOR USE IN THE PRODUCTION THEREOF

[75] Inventor: Helge S. Paulin, Vejle, Denmark

[73] Assignee: Tulip Slagterierne A.M.B.A., Vejle, Denmark

[21] Appl. No.: 413,992

[22] Filed: Sep. 28, 1989

[30] Foreign Application Priority Data

Sep. 29, 1988 [DK] Denmark ............................ 5417/88

[51] Int. Cl.$^5$ ................................................ A23L 1/31
[52] U.S. Cl. ..................................... 426/56; 426/518; 426/519; 426/520; 426/646
[58] Field of Search .................. 426/56, 646, 520, 521, 426/524, 407, 518, 519

[56] References Cited

U.S. PATENT DOCUMENTS

| | | | |
|---|---|---|---|
| 2,140,781 | 12/1938 | Allen | 426/56 |
| 2,321,623 | 6/1943 | Ramsbottom et al. | 426/56 |
| 3,987,209 | 10/1976 | Andre et al. | 426/407 |
| 4,492,712 | 1/1985 | Casella | 426/59 |
| 4,572,839 | 2/1986 | Guitteny | 426/59 |
| 4,677,069 | 6/1987 | Chen et al. | 426/56 |

FOREIGN PATENT DOCUMENTS

3521/74 7/1974 Fed. Rep. of Germany.
2021921 12/1979 United Kingdom.

*Primary Examiner*—R. B. Penland

[57] ABSTRACT

A forcemeat composed of meat, fat or no fat, water, one or more salts, and seasoning in the form of one or more spices plus perhaps other proteins of animal or vegetable origin is described. During the production of the forcemeat in a fast chopping or mincing machine or other equipment a heat sensitive enzyme-containing material essentially being or containing proteinase is admixed. The heat sensitive enzyme-containing material may be an extract resulting from the growth of *Mucor miehei* or a material having corresponding or similar properties, perhaps of animal, vegetable, or microbial origin. The thus added proteinase is distributed or dispersed in the forcemeat by the chopping or mincing and exerts an influence on the meat proteins and other perhaps present proteins during a heat treatment given to the forcemeat. The enzyme or enzymes are destroyed by the heat treatment. This ensures that the forcemeat will keep. The heat sensitive enzyme-containing material of the invention when used in forcemeat in the way mentioned results in less secretion of a material turning into jelly and less secretion of fat in the finished product as well as an improved consistency or texture and appearance of the finished product. The smell or scent and the taste or flavor remain unchanged. The forcemeat produced may be used in ways generally known in the art.

3 Claims, No Drawings

FORCEMEAT HAVING IMPROVED PROPERTIES, METHOD FOR THE PRODUCTION THEREOF AND HEAT SENSITIVE ENZYME CONTAINING MATERIAL FOR USE IN THE PRODUCTION THEREOF

BACKGROUND OF THE INVENTION

1. Field of the Invention

The present invention relates to forcemeat having improved properties, a method for the production thereof and a heat sensitive enzyme-containing material for use in the production thereof.

2. Background Art

In the art, forcemeat is used as the basis for the production of a number of meat products. The production of these products involves a heat treatment causing the proteins in forcemeat to alter irreversibly. This alteration of the forcemeat leads inter alia to the secretion of a material turning into jelly as the forcemeat shrinks during the heating.

In the production of forcemeat, caseinate is used to a great extent. In general this addition brings about a decrease in the amount of the fat being secreted during heating of the forcemeat. By treating caseinate with certain enzymes, it is possible to impart to this additive both water binding power and the power to bind fat. The enzymatic effect is due to the splitting off of a carbohydrate containing peptide from the casein molecule. Hereby the water soluble casein is converted into a water insoluble casein. This casein is able to bind an amount of water of three to four times its own weight and to retain this water during heating and cooling of the forcemeat.

The treatment of caseinate with enzymes may take place in different ways. Firstly, methods have been developed for precipitating casein by means of enzymes and the subsequent addition of the formed coagulum to forcemeat. In this case there is achieved a certain improvement of the ability of the forcemeat to retain water during a heat treatment. Secondly, it is possible to add the enzyme to raw forecemeat that contains caseinate. When this forcemeat stands or is heated, the water soluble caseinate present in the forcemeat is converted into water insoluble caseinate. The enzyme will become inactivated by the heat and will not be active in the finished product.

A number of different enzymes have been used for the conversion of casein when producing forcemeat. Thus, it has been stated that pepsin and rennin are capable of converting casein in the way indicated above.

Enzymes of the above mentioned type have in general brought about a relatively limited reduction in the amount of material turning into jelly during heat treatment. This has in part to do with the fact that the enzyme is quickly inactivated by the heat and in part with the fact that the enzyme to a certain extent decomposes meat protein. This decomposition gives rise to a greater secretion of liquid and an inferior quality of the finished produce.

The quality of forcemeat that has been subjected to a heat treatment is determined by the amount of secreted jelly and fat, if fat is present, appearance, smell or scent, taste or flavour, plus consistency or texture.

SUMMARY OF THE INVENTION

Now, having regard to the above mentioned prior art it is the object of the present invention to provide (1) a forcemeat consisting of meat, with or without fat, water, one or more salts and seasoning in the form of one or more spices plus perhaps other proteins of animal or vegetable origin and having improved properties with respect to the amount of secreted jelly and fat, to the consistency or texture, and to the appearance, while the smell or scent and the taste or flavour remain unchanged, (2) a method for the production of this forcemeat and (3) a heat sensitive enzyme-containing material for use in the production of this forcemeat.

Part (1) of the stated object of the present invention is achieved during production of a forcemeat in a fast chopping or mincing machine by admixing a heat sensitive enzyme-containing material, the material being or containing proteinase.

The admixture of said heat sensitive enzyme-containing material alters the mode of behaviour of the proteins in such a way that the raw forcemeat secretes less material turning into jelly and less fat when subjected to a heat treatment, and likewise the finished produce gets a more attractive appearance and a firmer consistency or texture with respect to forcemeat having no addition of an enzyme-containing material. The production of forcemeat in this way does not give rise to an alteration of the smell or scent or the taste or flavour of the finished produces.

During the heat treatment of the raw forcemeat, the heat sensitive enzyme-containing material is first rendered active and next destroyed by way of the heat treatment.

The enzyme-containing material according to the invention, i.e., a material that is essentially proteinase or a composition containing proteinase, may be used in forcemeat having no addition of proteins originating from raw materials other than meat. Moreover, said enzyme-containing material may be admixed to forcemeat containing other proteins of animal or vegetable origin. These proteins comprise, inter alia, caseinate as well as pea and soya proteins.

The forcemeat of the invention differs from the above described prior art in two respects: (1) It contains a new enzyme-containing material, viz. the heat sensitive enzyme-containing material according to the invention, and (2) the way in which this enzyme-containing material has been admixed with the other ingredients of the forcemeat according to the invention.

The heat sensitive enzyme-containing material according to the invention may be made up of an aqueous extract that may have been dried. As a basis, mould fungi, including *Mucor miehei*, or other microorganisms, as well as animal or vegetable tissue, may be used. The maximum effect is provided by rennet classified by the International Union of Biochemistry as EC 3.4.23.6. Furthermore, the material, being essentially proteinase or a composition containing proteinase, is sensitive to heat in such a way that less than 1 per cent of the protein converting capacity remains after a treatment for 15 seconds at 68° C. and pH 6.0 or at 72° C. and pH 5.6. The capacity for converting protein is determined according to a method treated in a publication having the No. 67/3-e and published by Novo Industri in March 1972.

The thus described sensitivity to heat may have been achieved by the action on the enzyme-containing material, viz. the enzyme-containing material being essentially proteinase or a composition containing proteinase, of a number of chemical compounds, including hydrogen peroxide, peracetic acid, sodium hypochlorite or potassium peroxymonosulphate.

The effect on forcemeat of proteinase sensitive to heat depends on the potency of the enzyme in the forcemeat. This potency is determined on the basis of the capacity of the enzyme for converting a given protein under predetermined circumstances. In this case there is used a determination of the potency on the basis of the method that has been published in a publication having the No. 67/3-e and published by Novo Industri in March 1972.

The method of admixture mentioned above under (2) is a new and third way of admixture as compared with the two ways of admixture mentioned above as a part of the prior art.

Compared with the above prior art the heat sensitive enzyme-containing material of the invention differs from that prior art in that it is first rendered active and next destroyed during a heat treatment of raw forcemeat containing the heat sensitive enzyme-containing material of the invention. During this period of activity it promotes the conversion of water soluble casein when present in the forcemeat into water insoluble casein, accompanied by a limited decomposing action on meat proteins, this limited decomposing action usually being less extensive that in the prior art.

It is preferred in connection with the forcemeat according to the invention that the heat sensitive enzyme-containing material is a material, e.g. an extract, resulting from the growth of *Mucor miehei* or a material having corresponding or similar properties.

It is further preferred in connection with the forcemeat according to the invention that the added heat sensitive enzyme-containing material stems from the growth of *Mucor miehei* and is sensitive to heat in such a way that less than 1 per cent of the protein converting capacity remains after a treatment for 15 seconds at 68° C. and pH 6.0 or at 72° C. and pH 5.6, the capacity for converting protein being determined according to a special method according to Berridge, this method being treated in a publication having the No. 67/3-e and published by Novo Industri in March 1972.

It is still also preferred in connection with the forcemeat according to the invention that the added heat sensitive enzyme-containing material is of animal, vegetable or microbial origin and is sensitive to heat in such a way that less than 1 per cent of the protein converting capacity remains after a treatment for 15 seconds at 68° C. and pH 6.0 or at 72° C. and pH 5.6, the capacity for converting protein being determined according to a special method according to Berridge, this method being treated in a publication having the No. 67/3-e and published by Novo Industri in March 1972.

It is desirable in connection with the forcemeat according to the invention containing no other proteins than proteins stemming from meat that the proteins stemming from meat are stemming from no other raw materials than meat cut off by hand, meat extracted by machine, or a mixture thereof.

It is preferred in connection with the forcemeat according to the invention containing animal protein that the animal protein is an animal protein in the form of caseinate.

It is alternatively preferred in connection with the forcemeat according to the invention containing animal protein that the animal protein is an animal protein that is not caseinate.

It is preferred in connection with the forcemeat according to the invention containing vegetable protein that the vegetable protein is a vegetable protein in the form of soya protein.

Moreover, it is alternatively preferred in connection with the forcemeat according to the invention containing vegetable protein that the vegetable protein is a vegetable protein that is not soya protein.

In addition it is desirable in connection with the forcemeat according to the invention containing one or more salts that other than sodium chloride or sodium nitrite have been added.

Part (2) of the stated object of the present invention is achieved by a method for the production of the forcemeat of the invention comprising comminuting and mixing meat and other ingredients to form forcemeat are performed in a fast chopping or mincing machine, emulsifying machine or equipment having a corresponding or similar mode of action, during the production of the forcemeat admixing a heat sensitive enzyme-containing material containing proteinase preferably rennet classified as EC 3.4.23.6 by the International Union of Biochemistry sensitivity to heat causing the enzyme-containing material according to the invention to preserve less than 1 per cent of protein converting capacity after a treatment for 15 seconds at 68° C. and pH 6.0 or at 72° C. and pH 5.6, the capacity for converting protein being determined according to a publication having the No. 67/3-e and published by Novo Industri in March 1972.

The method described may be used in connection with all kinds of forcemeat products including luncheon meat, sausages of various kinds including frankfurters as well as pies, pâtés, patties and the like.

It is preferred in connection with the method according to the invention for the production of forcemeat according to the invention that the forcemeat is produced by chopping or mincing sausage meat of pork, ice and enzyme material according to the invention mixed with water at a speed of the knife of 3,000 r.p.m. and a speed of the bowl of 30 r.p.m. until the temperature is 10.5°±0.5° C., that the chopped or minced fat trimmings are added after which the forcemeat is worked for 15 seconds at a speed of the knife of 1,500 r.p.m. and a speed of the bowl of 15 r.p.m., that the mixing of the forcemeat takes place in a partial vacuum at a speed of the knife of 60 r.p.m. and a speed of the bowl of 30 r.p.m., and that the working of the forcemeat is continued at a speed of the knife and the bowl of 30 r.p.m. and 15 r.p.m. respectively until a temperature of 12.0°±0.5° C. is achieved.

It is a supplement to the method according to the invention to fill the raw forcemeat resulting from the above defined method in tins or cans to close the tins or cans in a partial vacuum, to subject the closed tins or cans to a heat treatment at 108° C. for 60 minutes, and then to cool the tins or cans to 20° C.

During the heat treatment the proteinase or proteinases exert its or their action on the different ingredients and is or are then rendered inactive.

As a rule, fat is added to the forcemeat in the form of chopped or minced fatty tissue or fat that has been melted out. In order to ensure that the fat remains bound in the forcemeat, the fat may be emulsified with proteins under cold conditions or under warm conditions.

Sodium chloride and sodium nitrite find general use as additives to forcemeat. Other salts, including potassium and magnesium chloride, plus phosphates form at times part of the forcemeat.

Forcemeat according to the invention may as mentioned above be produced having no fat or with the addition of said forms of fat and equally the effect is not influenced by the added inorganic compounds.

Production of forcemeat in an industrialized way usually uses a fast chopping or mincing machine, but other kinds of chopping/mincing and mixing equipment are also used. Forcemeat according to the invention may be produced in any kind of equipment that renders it possible to comminute and mix the ingredients forming the forcemeat.

Below the production of forcemeat is described in detail in three comparative examples, in three examples, and in a table following the last example. The comparative examples illustrate the production of forcemeat not according to the invention as no enzyme-containing material is among the ingredients of the forcemeat. The examples illustrate the production of forcemeat according to the invention. Three properties were determined on samples of the forcemeat produced in each of these comparative examples as well as in each of these examples in the way described in the last but two paragraph and the last but one paragraph in example 1. The results of these determinations are given in the table mentioned.

COMPARATIVE EXAMPLE 1

Forcemeat is produced and tested in the same way as in example 1 below with one exception: No heat sensitive enzyme containing material is used.

EXAMPLE 1

Forcemeat having no added animal or vegetable proteins is produced from the following ingredients:
41.24 per cent sausage meat of pork
50.91 per cent fat trimmings
5.16 per cent ice
2.48 per cent water
0.11 per cent seasoning in the form of a mixture of spices, the mixture being composed of white pepper, mace and coriander
0.10 per cent heat sensitive enzyme material according to the invention extracted from Mucor miehei and having a potency of 14 RU per gram The sausage meat of pork is salted slightly for 24 hours at 2° C. by means of 2.5 per cent of a salt mixture containing 99.6 per cent sodium chloride and 0.4 per cent sodium nitrite. Fat trimmings having a fat content of 56 per cent are pretreated in a corresponding way and are then chopped or minced through a 5 mm disc having a pattern of holes.

Forcemeat for binding is produced by chopping or mincing sausage meat of pork, ice, and enzyme material according to the invention mixed with water at a speed of the knife of 3,000 r.p.m. and a speed of the bowl of 30 r.p.m. until the temperature is 10.5°±0.5° C. Chopped or minced fat trimmings are added after which the forcemeat is worked for 15 seconds at a speed of the knife of 1,500 r.p.m. and a speed of the bowl of 15 r.p.m. The mixing of the forcemeat takes place in a partial vacuum at a speed of the knife of 60 r.p.m. and a speed of the bowl of 30 r.p.m. Finally the working of the forcemeat is continued at a speed of the knife and the bowl of 30 r.p.m. and 15 r.p.m. respectively until a temperature of 12.0°±0.5° C. is achieved.

The raw forcemeat is filled in rectangular tins or cans having the measurements 90·50·45 mm, and the tins are closed in a partial vacuum. Next the forcemeat is subjected to a heat treatment at 108° C. for 60 minutes after which it is cooled to 20° C.

Three properties of the finished produce are determined. The amount of jelly and secreted fat—having the form of a fat border—is determined by scraping off and weighing and the consistency or texture is determined by compression testing. Appearance, smell or scent and taste or flavour are evaluated by trained arbiters. The compression testing takes place by punching out a tubular sample having a cross section 50 mm and a length 45 mm. The sample is compressed in the longitudinal direction by means of a piston, the velocity of the travel of the piston being kept at 50 mm per minute. The piston is stopped when the sample has been compressed 20 mm in the longitudinal direction. The maximum pressure obtained hereby is regarded as a measure of the consistency or texture of the forcemeat.

The results of the determinations of the three said properties are given in the table below.

COMPARATIVE EXAMPLE 2

Forcemeat is produced and tested in the same way as in example 2 below with one exception: No heat sensitive enzyme containing material is used.

EXAMPLE 2

Forcemeat is produced as described in example 1, but 12.5 per cent of the meat protein is replaced by protein stemming from a soya protein concentrate having a high nitrogen solubility. The three properties determined on the forcemeat produced in example 1 are also determined on the forcemeat produced in this example. The results of these determinations are given in the table below.

COMPARATIVE EXAMPLE 3

Forcemeat is produced and tested in the same way as in example 3 below with one exception: No heat sensitive enzyme containing material is used.

EXAMPLE 3

Forcemeat is produced as described in example 1, but 12.5 per cent of the meat protein is replaced by protein stemming from a sodium caseinate having a low viscosity. The three properties determined on the forcemeat produced in example 1 are also determined on the forcemeat produced in this example. The results of these determinations are given in the table below.

TABLE

Properties of forcemeat produced without and with addition of rennet (heat sensitive, EC 3.4.23.6)

| Property measured | Composition | | | | | |
|---|---|---|---|---|---|---|
| | 100 per cent meat protein produced | | 87.5 per cent meat protein 12.5 per cent soya protein produced | | 87.5 per cent meat protein 12.5 per cent casinate produced | |
| | without rennet | with rennet | without rennet | with rennet | without rennet | with rennet |
| Jelly per cent | 5.46 | 3.99 | 7.81 | 6.63 | 8.18 | 5.96 |
| Fat border per cent | 0.72 | 0.34 | 1.20 | 1.10 | 0.69 | 0.48 |
| Maximum pressure | 48.96 | 52.37 | 45.10 | 48.27 | 46.52 | 51.02 |

TABLE-continued

| | Properties of forcemeat produced without and with addition of rennet (heat sensitive, EC 3.4.23.6) | | | | | |
|---|---|---|---|---|---|---|
| | Composition | | | | | |
| | 100 per cent meat protein produced | | 87.5 per cent meat protein 12.5 per cent soya protein produced | | 87.5 per cent meat protein 12.5 per cent casinate produced | |
| Property measured | without rennet | with rennet | without rennet | with rennet | without rennet | with rennet |
| kPa | | | | | | |

The results in the table show that a reduction in the amount of secreted material turning into jelly and of secreted fat plus an increase of the maximum pressure in compressing the forcemeat take place when comparing the properties of the forcemeats composed and produced according to the invention in the examples with the properties of the forcemeats not composed and not produced according to the invention in the examples of comparison. Hereby the appearance is improved while the smell or scent and the taste or flavour remain unchanged.

Thus, the invention improves the properties of forcemeat.

What has been stated or indicated in the present specification in a concrete or specific way concerning the present invention has been stated or indicated solely as examples and should in no way be considered or thought of as limiting the scope of the present invention, the scope of the present invention being defined solely by the appended claims as it is possible to make many a modification, change or substitution without passing wholly or in part the limits of the scope of the present invention or without departing wholly or in part from the spirit of the present invention.

I claim:

1. A method for the production of forcemeat comprising:
   comminuting and mixing meat, water, at least one salt and at least one spice while admixing therewith a heat sensitive enzyme containing material, said enzyme containing material including proteinase and rennet;
   heat treating said mixture for 15 seconds at 68° C. and pH 6.0 or at 72° C. and pH 5.6; the sensitivity to heat causing said enzyme containing material to retain less than 1% of protein converting capacity after said heat treatment; said heat treatment producing a solid firm product exhibiting reduced jelly and fat secretion.

2. A method for the production of forcemeat according to claim 1, wherein the step of comminuting and mixing comprises:
   first comminuting by chopping or mincing sausage meat of pork, plus ice and enzyme material mixed with water, in a rotating bowl with a rotating knife, at a knife speed of 3,000 r.p.m. and a bowl speed of 30 r.p.m. until the temperature is 10.5°±0.5° C.,
   adding chopped or minced fat trimmings,
   working the forcemeat for 15 seconds at a knife speed of 1,500 r.p.m. and a bowl speed of 15 r.p.m.,
   then mixing the comminuted forcemeat under a partial vacuum at a knife speed of 60 r.p.m. and a bowl speed of 30 r.p.m., and
   continuing working of the forcemeat at a knife speed and bowl speed of 30 r.p.m. and 15 r.p.m., respectively, until a temperature of 12.0°±0.5° C. is achieved.

3. A method for the production of forcemeat according to claim 1 or 2, comprising the further steps of filling the raw forcemeat in tins or cans, closing the tins or cans in a partial vacuum, subjecting the closed tins or cans to a heat treatment at 108° C. for 60 minutes, and then cooling the tins or cans to 20° C.

* * * * *